United States Patent [19]

Miyata et al.

[11] Patent Number: 4,472,370

[45] Date of Patent: Sep. 18, 1984

[54] PROCESSES FOR THE PRODUCTION OF SLAKED LIME AND MAGNESIUM HYDROXIDE

[75] Inventors: Shigeo Miyata, Takamatsu; Toru Hirose, Kagawa; Akira Okada, Takamatsu, all of Japan

[73] Assignee: Kyowa Chemical Industry Co. Ltd., Tokyo, Japan

[21] Appl. No.: 395,911

[22] Filed: Jul. 7, 1982

[30] Foreign Application Priority Data

Jul. 14, 1981 [JP] Japan ................................ 56-108823

[51] Int. Cl.$^3$ ............................................. C01B 5/00
[52] U.S. Cl. ...................................... 423/636; 423/164; 423/639
[58] Field of Search .............. 423/164, 397, 169, 497, 423/639, 636, 395, 462, 635, 640

[56] References Cited

U.S. PATENT DOCUMENTS

| | | | |
|---|---|---|---|
| 783,570 | 2/1905 | Ellis et al. ............................ | 423/640 |
| 2,178,983 | 4/1934 | Wienert ................................ | 423/160 |
| 4,098,762 | 7/1982 | Miyata et al. ........................ | 106/306 |
| 4,145,404 | 3/1979 | Miyata et al. ........................ | 423/497 |

FOREIGN PATENT DOCUMENTS 433253 7/1933 United Kingdom .

*Primary Examiner*—John Doll
*Assistant Examiner*—Jackson Leeds
*Attorney, Agent, or Firm*—Sherman & Shalloway

[57] ABSTRACT

Slaked lime (calcium hydroxide) is obtained by contacting quicklime (calcium oxide) with an aqueous solution containing at least one anion selected from the group consisting of Cl, Br and $NO_3$ ions in a concentration of about 0.1 to about 5 mole/liter at a temperature of about 10° C. to about 65° C. Magnesium hydroxide can be produced by reacting the aforesaid slaked lime with magnesium chloride or magnesium nitrate in an aqueous medium, the amount of slaked lime being about 0.5 to about 0.95 equivalent per equivalent of the magnesium compound, and thereafter heat-trating the reaction product in an aqueous medium at a temperature of about 150° C. to about 250° C.

8 Claims, No Drawings

PROCESSES FOR THE PRODUCTION OF SLAKED LIME AND MAGNESIUM HYDROXIDE

This invention relates to a new type of slaked lime which has different pH characteristics from known types of slaked lime (calcium hydroxide) and can be used to produce magnesium hydroxide with industrial advantages; a process for its production; and to its utilization.

Particularly, this invention relates to a new type of slaked lime which is less alkaline than slaked lime obtained by digesting quicklime (calcium oxide) by a conventional method in that the former has a pH of about 11.5 determined at 25° C. for its aqueous solution (1 mole/liter) whereas the latter shows a pH of about 12.5 determined at 25° C. for its aqueous solution (1 mole/liter); a process for its production; and to its utilization.

More specifically, this invention relates to a process for producing slaked lime (calcium hydroxide), which comprises contacting quicklime (calcium oxide) with an aqueous solution containing at least one anion selected from the group consisting of Cl, Br and $NO_3$ ions in a concentration of about 0.1 to about 5 moles/liter at a temperature of about 10° C. to about 65° C., and to slaked lime obtained by this process. It also pertains to a process for producing magnesium hydroxide as well-grown crystals with reduced agglomeration by utilizing the aforesaid slaked lime of this invention, and to magnesium hydroxide obtained by this process.

Heretofore, slaked lime has been produced either by adding quicklime to water and stirring the mixture; digesting quicklime by adding water in an amount sufficient to convert quicklime to slaked lime; or by contacting quicklime with steam.

Slaked lime (i.e., calcium hydroxide) obtained by such conventional methods is slightly less alkaline than sodium hydroxide, but is much more alkaline than aqueous ammonia.

It is known that in the production of magnesium hydroxide by the reaction of magnesium chloride with an alkaline substance, the use of aqueous ammonia as the alkaline substance induces a more homogeneous reaction to give magnesium hydroxide as better-grown crystals with less agglomeration than the use of calcium hydroxide as the alkaline substance. The use of aqueous ammonia, however, has the defect that because its alkalinity is slightly weak (pK=9.245 at 25° C.; see page 1054 of "Kagaku Binran", or Manual of Chemistry), the yield of magnesium hydroxide is considerably low and the product is expensive.

It has now been found unexpectedly that a new type of slaked lime showing an alkalinity closer to that of aqueous ammonia can be prepared from quicklime (calcium oxide) which is cheap and easily obtainable and occurs in nature almost inexhaustibly.

Our investigations have led to the discovery that slaked lime obtained by contacting quicklime with an aqueous solution containing at least one anion selected from the group consisting of Cl, Br and $NO_3$ ions in a concentration of about 0.1 to about 5 moles/liter at a temperature of about 10° C. to about 65° C. shows a pH of about 11.5 (at 25° C. and 1 mole/liter) which is lower by about 1 than the pH (about 12.5 at 25° C. and 1 mole/liter) of slaked lime obtained in accordance with a conventional method by digesting quicklime with water or steam.

We have also found that when the new type of slaked lime of this invention is used in the production of magnesium hydroxide by reacting an aqueous solution of a magnesium salt such as magnesium chloride with an alkaline substance, there occurs a homogeneous reaction which is nearer to that which takes place as a result of using aqueous ammonia than that which takes place as a result of using a conventional type of slaked lime, because the pH of the reaction system is about 11.5 at the highest. We have observed further that since the slaked lime of the invention shows a higher alkalinity than aqueous ammonia, the aforesaid process for producing magnesium hydroxide can avoid the low yield and high cost associated with the use of aqueous ammonia, and excellent magnesium hydroxide in the form of well-grown crystals with reduced agglomeration can be obtained.

Calcium hydroxide (slaked lime) has dissociation constants at 25° C. of 11.570 ($pK_1$) and 12.63 ($pK_2$) ("Kagaku Binran"), and dissociates its $OH^-$ in two stages. We presume that in the present invention, the second dissociation ($pK_2 = 12.63$) is inhibited as a result of forming slaked lime neutralized with an anion selected from Cl, Br and $NO_3$ anions, and therefore, the resulting slaked lime has pH lower by about 1 than the slaked lime obtained by a conventional process. The present invention, however, is not bound by such a presumption.

It is an object of this invention to provide a new type of slaked lime, and a process for its production.

Another object of this invention is to provide a process for producing magnesium hydroxide of excellent quality by utilizing this new type of slaked lime, and also the resulting magnesium hydroxide.

The above and other objects and advantages of this invention will become apparent from the following description.

The slaked lime of this invention can be obtained by contacting quicklime with an aqueous solution containing at least one anion selected from the group consisting of Cl, Br and $NO_3$ ions in a concentration of about 0.1 to about 5 moles/liter, preferably about 1 to about 5 moles/liter, at a temperature of about 10° C. to about 65° C.

In forming the aforesaid aqueous solution, there can be used water-soluble compounds capable of yielding the aforesaid anions. Examples of such compounds include sodium chloride, potassium chloride, calcium chloride, strontium chloride, barium chloride, sodium bromide, potassium bromide, calcium bromide, strontium bromide, barium bromide, ammonium chloride, ammonium bromide, sodium nitrate, potassium nitrate, calcium nitrate, strontium nitrate and barium nitrate. Of these, sodium chloride, potassium chloride, ammonium chloride and calcium chloride are preferred.

Preferably, fresh quicklime with least moisture absorption is used. The contacting of quicklime with the aqueous solution containing the anion in the above-specified concentration is carried out at a temperature of about 10 to about 65° C., preferably about 20° to about 60° C.

If the concentration of the anion is less than about 0.1 mole/liter, the resulting slaked lime is the same as the conventional slaked lime or slaked lime close to it. If, on the other hand, it exceeds about 5 moles/liter, a basic salt such as $3Ca(OH)_2 \cdot CaCl_2 \cdot 13H_2O$, will be formed. Hence, the concentration of the anion should be properly selected within the above-specified range. If in the process of this invention the contacting temperature is lower than about 10° C., the aforesaid basic salt tends to be formed. If it exceeds about 65° C., the resulting slaked lime is the same as the conventional slaked lime or slaked lime close to it. Accordingly, the contacting temperature should be selected within the above-specified range.

The contacting of quicklime with the anion-containing aqueous solution can be effected for a relatively short period of time. Since quicklime is a solid, it is preferred to perform a stirring operation so as to increase the rate of the reaction and to cause the reaction to proceed uniformly. The reaction can be completed in about 10 minutes to about 60 minutes. The slurry of the reaction product formed as above shows a pH of, for example, 11 to 11.8, mostly 11.3 to 11.7, and particularly 11.4 to 11.6, thus centering around 11.5. This pH value is quite different from that (about 12.5) of a slaked lime slurry formed by a conventional digesting method.

It is presumed that the slaked lime of the invention which can be obtained as above is not strictly in the form of calcium hydroxide $Ca(OH)_2$ but in the form of $Ca(OH)_{2-x}A^-_x$, wherein $A^{31}$ represents at least one anion selected from the group consisting of Cl, Br and $NO_3$ ion, and x is in the range of $0 < x <$ about 0.1, as a result of a small amount of the anion replacing OH. Accordingly, the slaked lime of this invention is not fully stable, and is preferably utilized within a relatively short period after preparation. Since its pH gradually increases with time, it should preferably be used at an early stage when its pH does not approach or reach the pH of slaked lime obtained by a conventional method.

The new type of slaked lime of this invention can be used in the same applications as the conventional types of slaked lime. It can exhibit its excellent characteristics particularly in the production of a metal hydroxide, especially magnesium hydroxide, by reacting a water-soluble metallic compound (excepting hydroxides) with an alkali.

For example, if the slaked lime of this invention is used as an alkali in the technique disclosed by the same applicant as the present one in the invention entitled "MAGNESIUM HYDROXIDE HAVING A NOVEL STRUCTURE, ITS INTERMEDIATE, AND PROCESSES FOR PRODUCTION THEREOF" (Japanese Laid-Open Patent Publication No. 115799/1977; corresponding to U.S. Pat. Nos. 4,098,762 and 4,145,404, British Pat. No. 1,514,081, and West German Pat. No. 2,624,065), it is possible to increase the yield of the intermediate, and to improve markedly the yield, degree of crystal growth, and dispersibility of magnesium hydroxide having the novel structure.

In the above-cited prior technique, magnesium hydroxide is produced by reacting magnesium chloride or magnesium nitrate with an alkaline substance in an aqueous medium, the proportion of the alkaline substance being 0.5 to 0.95 equivalent per equivalent of magnesium chloride or nitrate, to form basic magnesium chloride or nitrate of the following formula

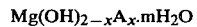

$Mg(OH)_{2-x}A_x \cdot mH_2O$ wherein A represents Cl or $NO_3$, x is a number represented by $0 < x < 0.2$, and m is a number of from 0 to 6, and heat-treating the resulting intermediate in an aqueous medium (i.e., hydrothermal treatment) at a temperature of, for example, about 150° to about 250° C.

If the slaked lime of this invention is used as the alkaline substance in the formation of the intermediate represented by the above-given formula, the yield of the intermediate is increased as compared with the case of using conventional slaked lime. When such an intermediate is hydrothermally treated, the crystals are grown better and the dispersibility of the product becomes higher than in the case of hydrothermally treating the intermediate obtained by using the conventional slaked lime. Consequently, it is possible to easily produce excellent magnesium hydroxide having a specific surface area of about 1 to about 10 m²/g, a crystal size of about 0.5 to about 5 μm and an average secondary particle size of about 0.5 to about 5 μm, and being substantially free from agglomeration.

Thus, according to another aspect of this invention, there is provided a process for producing magnesium hydroxide, which comprises contacting quicklime with an aqueous solution containing at least one anion selected from the group consisting of Cl, Br and $NO_3$ ions in a concentration of about 0.1 to about 5 moles/liter at a temperature of about 10° C. to about 65° C., reacting the resulting slaked lime with magnesium chloride or magnesium nitrate in an aqueous medium, the amount of the slaked being about 0.5 to about 0.95 equivalent per equivalent of the magnesium compound, and heat-treating the reaction product in an aqueous medium at a temperature of about 150° C. to about 250° C. In the practice of this process, one can follow the same operation as is disclosed in the above-cited Japanese Laid-Open Patent Publication and other corresponding patents mentioned except that the slaked lime of this invention is used as the alkali.

The following examples illustrate the present invention more specifically.

EXAMPLE 1

One hundred grams of granular quicklime having a size of about 5 cm was added to 1 liter of an aqueous solution of calcium chloride (2 moles/liter as Cl⁻) kept at about 20° C., and the mixture was stirred for about 10 minutes. The resulting slaked lime slurry was pulverized for about 5 minutes by a ball mill. The slaked lime had a pH (determined at 25° C. for an aqueous solution having a concentration of 1 mole/liter by pH meter; all pH values given in the following examples were determined under the same conditions) of 11.4.

EXAMPLE 2

A stainless steel vessel having a capacity of about 2 liters was placed in a constant temperature bath kept at 25° C. One liter of an aqueous solution of NaCl (2.5 moles/liter as Cl⁻) was put in the vessel. After the temperature of the aqueous solution reached 25° C., 50 g of quicklime having a size corresponding to 80 mesh-under was added with stirring. The mixture was stirred for about 15 minutes. The resulting slurry of the reaction product has a pH of 11.5. When the stirring was stopped and the slurry was allowed to stand for 24 hours, the slaked lime had a pH of about 11.6.

EXAMPLE 3

The temperature of 1 liter of an aqueous solution of calcium nitrate (0.5 mole/liter as $NO_3^-$) was adjusted to about 15° C., and 90 g of quicklime having a particle size of about 2 cm was added. The mixture was stirred for about 30 minutes. The resulting slaked lime had a pH of 11.4.

EXAMPLE 4

The temperature of 1 liter of an aqueous solution of calcium chloride and sodium chloride (2.2 moles/liter and 1.0 mole/liter both as $Cl^-$) was adjusted to 20° C., and 150 g of quicklime having a particle diameter of about 2 mm was added. The mixture was stirred for about 20 minutes. The resulting slaked lime has a pH of 11.2.

COMPARATIVE EXAMPLE 1

Fifty grams of quicklime having a size corresponding to 80 mesh-under was added to 1 liter of an aqueous solution of calcium chloride (0.04 mole/liter as $Cl^-$) at 20° C. The mixture was stirred for about 10 minutes. After the reaction, the resulting slaked lime had a pH of 12.3.

COMPARATIVE EXAMPLE 2

One hundred grams of quicklime having a size corresponding to 80 mesh-under was added to 1 liter of an aqueous solution of calcium chloride (6 moles/liter as $Cl^-$) at 10° C., and the mixture was stirred for about 20 minutes. By examination under an optical microscope, the reaction product was found to be in the form of fibrous crystals. Analysis by X-ray powder diffraction led to the determination that it was $3Ca(OH)_2 \cdot CaCl_2 \cdot 13H_2O$. This product was insoluble in water, and not suitable for use as an alkali.

COMPARATIVE EXAMPLE 3

One liter of an aqueous solution of sodium chloride (4 moles/liter as $Cl^-$) was heated to about 70° C. With stirring, 100 g of quicklime having a size corresponding to 80 mesh-under was added to the solution. The mixture was stirred for about 10 minutes. After the reaction, the slaked lime has a pH of 12.5.

COMPARATIVE EXAMPLE 4

The temperature of 1 liter of an aqueous solution of calcium chloride (2.4 moles/liter as $Cl^-$) was adjusted to 5° C., and 100 g of quicklime having a size corresponding to 80 mesh-under was added. The mixture was stirred for 20 minutes. The reaction product was determined to be $3Ca(OH)_2 \cdot CaCl_2 \cdot 13H_2O$ in the form of fibrous crystals as a result of examination by an optical microscope and X-ray powder diffraction.

COMPARATIVE EXAMPLE 5

One hundred grams of quicklime having a size corresponding to 80 mesh-under was added to 1 liter of water at 25° C. with stirring, and the mixture was stirred for about 15 minutes. The resulting slaked lime had a pH of 12.5.

EXAMPLE 5

The slaked lime obtained in Example 1 was added with stirring to 1 liter of an aqueous solution of magnesium chloride (2 moles/liter) at 20° C. The amount of the quicklime was 0.8 equivalent per equivalent of magnesium. The mixture was further stirred for about 15 minutes. One liter of the resulting slurry was transferred to a 2-liter autoclave, and hydrothermally treated at 180° C. for 4 hours.

The resulting magnesium hydroxide has a BET specific surface area of 2 $m^2/g$ and an average secondary particle diameter of 2 $\mu m$.

COMPARATIVE EXAMPLE 6

The slaked lime obtained in Comparative Example 5 was used in the reaction of Example 5, and the reaction product was hydrothermally treated as in Example 5 to give magnesium hydroxide having a BET specific surface area of 12 $m^2/g$ and an average secondary particle diameter of 0.4 $\mu m$.

What we claim is:

1. A process for producing slaked lime (calcium hydroxide) having a pH of 11 to 11.8 (at 25° C. and 1 mole/liter), which comprises reacting quicklime (calcium oxide) with an aqueous solution containing at least one anion selected from the group consisting of Cl, Br and $NO_3$ ions in a concentration of about 0.1 to about 5 moles/liter at a temperature of about 10° C. to about 65° C.

2. A process of claim 1 wherein said aqueous solution is an aqueous solution of at least one compound selected from the group consisting of $CaCl_2$, NaCl, KCl and $NH_4Cl$.

3. A process of claim 1 wherein the concentration of the anion is about 1 to about 5 moles/liter.

4. A process for producing magnesium hydroxide, which comprises contacting quicklime (calcium oxide) with an aqueous solution containing at least one anion selected from the group consisting of Cl, Br and $NO_3$ ions in a concentration of about 0.1 to about 5 moles/liter at a temperature of about 10° C. to about 65° C. to form slaked lime having a pH of 11 to 11.8 (at 25° C. and 1 mole/liter), reacting the resulting slaked lime (calcium hydroxide) with magnesium chloride or magnesium nitrate in an aqueous medium, the amount of the slaked lime being about 0.5 to about 0.95 equivalent per equivalent of the magnesium compound, and thereafter heat-treating the reaction product in an aqueous medium at a temperature of about 150° C. to about 250° C.

5. The process of claim 1 wherein the quicklime is reacted with said aqueous solution at a temperature of about 20° C. to about 60° C.

6. The process of claim 4 wherein the quicklime is reacted with said aqueous solution at a temperature of from about 20° C. to about 60° C.

7. The process of claim 1 wherein the slaked lime has a pH of about 11.4 to 11.6.

8. The process of claim 4 wherein the slaked lime formed by reacting quicklime with said aqueous solution has a pH of about 11.4 to 11.6.

* * * * *